United States Patent
Crawley et al.

(10) Patent No.: US 8,397,514 B2
(45) Date of Patent: Mar. 19, 2013

(54) SYSTEM AND METHOD FOR FLOW CONTROL IN GAS TURBINE ENGINE

(75) Inventors: Bradley Donald Crawley, Simsponville, SC (US); David William Cihlar, Greenville, SC (US); Abdul Rafey Khan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 13/115,063

(22) Filed: May 24, 2011

(65) Prior Publication Data

US 2012/0297786 A1 Nov. 29, 2012

(51) Int. Cl.
F02C 1/00 (2006.01)

(52) U.S. Cl. .......................... 60/772; 60/752

(58) Field of Classification Search ............... 60/39.37, 60/752–760, 772, 796
See application file for complete search history.

(56) References Cited

U.S. PATENT DOCUMENTS

| | | | | | |
|---|---|---|---|---|---|
| 2,621,477 | A | * | 12/1952 | Powter et al. | 60/39.23 |
| 2,722,803 | A | * | 11/1955 | Travers | 60/39.37 |
| 2,818,704 | A | * | 1/1958 | Karcher | 60/790 |
| 2,958,194 | A | * | 11/1960 | Bayler | 60/760 |
| 2,993,337 | A | * | 7/1961 | Cheeseman | 60/757 |
| 3,099,134 | A | * | 7/1963 | Calder et al. | 60/752 |
| 6,279,313 | B1 | * | 8/2001 | Lawen et al. | 60/797 |
| 6,334,294 | B1 | * | 1/2002 | Belsom et al. | 60/772 |
| 8,220,246 | B2 | * | 7/2012 | Widener | 60/39.37 |
| 8,276,391 | B2 | * | 10/2012 | Berry et al. | 60/782 |
| 2007/0062198 | A1 | * | 3/2007 | Huth et al. | 60/752 |
| 2008/0034759 | A1 | * | 2/2008 | Bulman et al. | 60/796 |
| 2010/0037620 | A1 | | 2/2010 | Chila | |
| 2011/0016869 | A1 | * | 1/2011 | Iwasaki | 60/752 |

OTHER PUBLICATIONS

U.S. Appl. No. 13/115,009, filed May 24, 2011, Cihlar et al.
U.S. Appl. No. 13/115,018, filed May 24, 2011, Melton et al.
U.S. Appl. No. 13/115,051, filed May 24, 2011, Melton et al.
U.S. Appl. No. 13/115,058, filed May 24, 2011, Melton et al.

* cited by examiner

*Primary Examiner* — Phutthiwat Wongwian
(74) *Attorney, Agent, or Firm* — Fletcher Yoder P.C.

(57) ABSTRACT

A system includes a gas turbine combustor, which includes a combustion liner disposed about a combustion region, a flow sleeve disposed about the combustion liner, an air passage between the combustion liner and the flow sleeve, a fuel injector disposed downstream of the combustion liner and the flow sleeve, a liner mount extending between the combustion liner and the flow sleeve, and a crossfire tube extending between the combustion liner and the flow sleeve. The fuel injector, the liner mount, and the crossfire tube are aligned with one another in a flow enhancing arrangement along a common axis in an axial direction relative to an axis of the gas turbine combustor. The flow enhancing arrangement reduces an air flow disturbance caused by the fuel injector, the liner mount, and the crossfire tube.

19 Claims, 5 Drawing Sheets

SYSTEM AND METHOD FOR FLOW CONTROL IN GAS TURBINE ENGINE

BACKGROUND OF THE INVENTION

The subject matter disclosed herein relates to combustion chambers, and, more particularly, to flow control within gas turbine engines.

Various combustion systems include combustion chambers in which fuel and air combust to generate hot gases. For example, a gas turbine engine may include one or more combustion chambers that are configured to receive compressed air from a compressor, inject fuel into the compressed air, and generate hot combustion gases to drive the turbine engine. Each combustion chamber may include one or more fuel nozzles, a combustion zone within a combustion liner, a flow sleeve surrounding the combustion liner, and a gas transition duct. Compressed air from the compressor flows to the combustion zone through a gap between the combustion liner and the flow sleeve. Structures may be disposed in the gap to accommodate various components, such as crossfire tubes, flame detectors, and so forth. Unfortunately, flow disturbances may be created as the compressed air passes by such structures, thereby decreasing performance of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine combustor, which includes a combustion liner disposed about a combustion region, a flow sleeve disposed about the combustion liner, an air passage between the combustion liner and the flow sleeve, a fuel injector disposed downstream of the combustion liner and the flow sleeve, a liner mount extending between the combustion liner and the flow sleeve, and a crossfire tube extending between the combustion liner and the flow sleeve. The fuel injector, the liner mount, and the crossfire tube are aligned with one another in a flow enhancing arrangement along a common axis in an axial direction relative to an axis of the gas turbine combustor. In addition, the flow enhancing arrangement reduces an air flow disturbance caused by the fuel injector, the liner mount, and the crossfire tube.

In a second embodiment, a system includes a turbine combustor alignment feature, which includes a turbine combustor liner mount configured to extend between a combustion liner and a flow sleeve of a gas turbine combustor and a turbine combustor structure configured to extend between the combustion liner and the flow sleeve. The turbine combustor liner mount and the turbine combustor structure are configured to align with one another in a flow enhancing arrangement along a common axis in an axial direction relative to an axis of the gas turbine combustor. In addition, the flow enhancing arrangement reduces an air flow disturbance caused by the turbine combustor liner mount and the turbine combustor structure.

In a third embodiment, a method includes directing an airflow about a crossfire tube extending between a combustion liner and a flow sleeve of a gas turbine combustor, directing the airflow about a liner mount extending between the combustion liner and the flow sleeve, and reducing an airflow disturbance by axially aligning the airflow about the crossfire tube and the liner mount.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
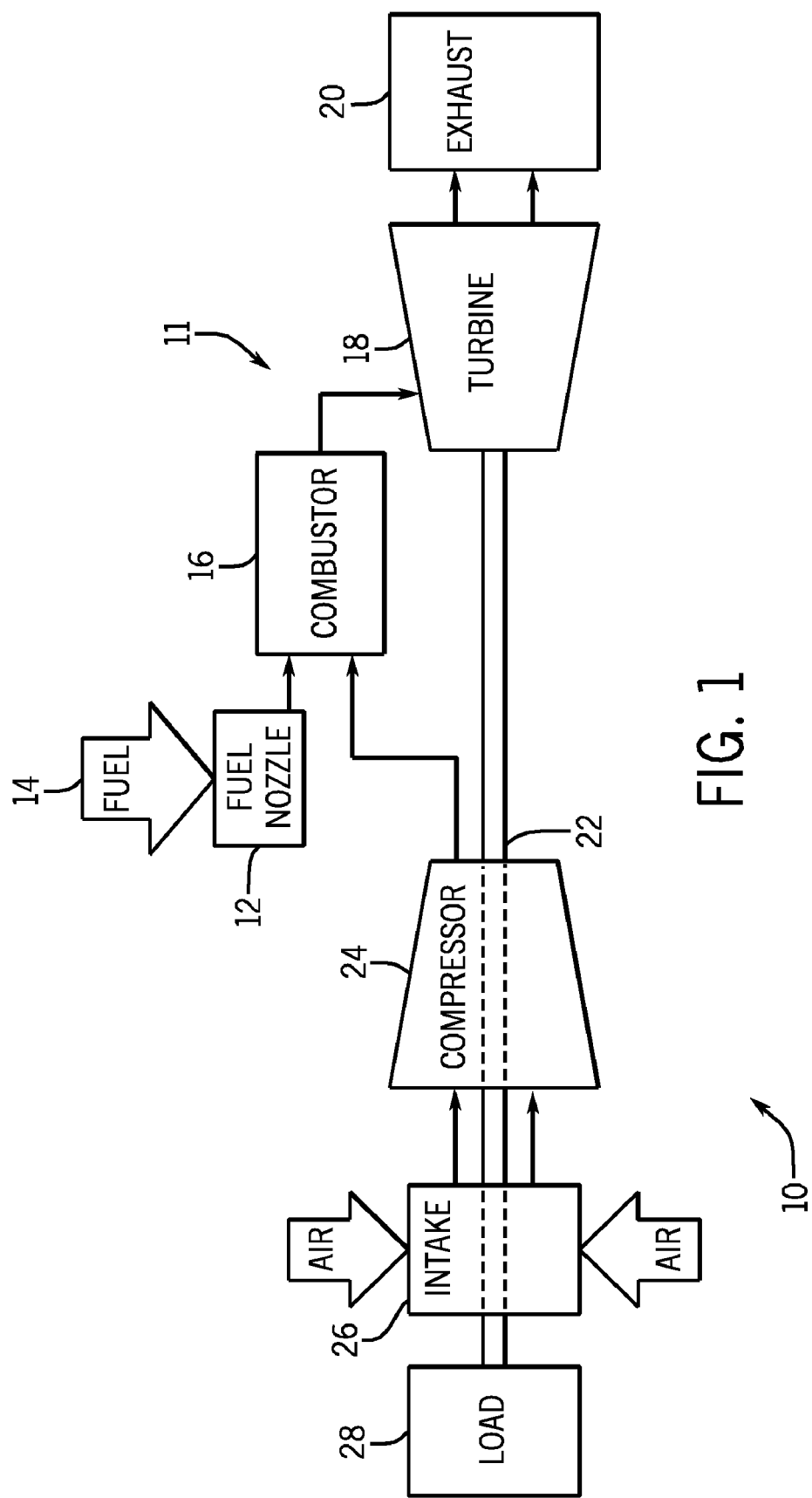
FIG. 1 is a block diagram of an embodiment of a turbine system having a combustor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for reducing air flow disturbances caused by structures obstructing a gas flow using a flow enhancing arrangement. For example, the structures may obstruct an airflow between a combustion liner and a flow sleeve of a gas turbine combustor of a gas turbine engine. The flow enhancing arrangement may involve axially aligning wakes from one or more of the structures. Specifically, the flow enhancing arrangement may include a fuel injector, a liner mount, and a crossfire tube aligned with one another in a flow enhancing arrangement along a common axis in an axial direction relative to an axis of the gas turbine combustor. One or more of the structures of the flow enhancing arrangement may include an airfoil shaped cross-section. In addition, the order of the structures may vary in various embodiments. Further, in certain embodiments, one or more of the structures may be coupled together. In the disclosed embodiments, alignment of the wakes from the structures helps to reduce the air flow disturbance in the gas turbine combustor.

The disclosed embodiments reduce the air flow disturbance caused by the structures in the gas turbine combustor to provide several benefits. For example, without the disclosed embodiments, fuel injected downstream of the flow enhancing arrangement may be pulled into the air flow disturbance. The fuel may accumulate in the air flow disturbance and cause flame holding, thereby decreasing performance of the gas turbine engine. In addition, the presence of air flow disturbances may result in a higher pressure drop across the combustion liner. The presently disclosed embodiments employ the flow enhancing arrangement to reduce the air flow disturbance and avoid the disadvantages of other methods of air flow disturbance reduction. For example, using the flow enhancing arrangement may reduce the possibility of flame holding, increase the gas turbine engine performance, and decrease the pressure drop across the combustion liner. In addition, the flow enhancing arrangement may be less expensive, less complicated, easier to manufacture and assemble, and more reliable than other methods of air flow disturbance reduction. Thus, use of the disclosed flow enhancing arrangements is particularly well suited for reducing air flow disturbances in gas turbine engines and other combustion systems.

FIG. 1 is a block diagram of an embodiment of a turbine system 10 having a gas turbine engine 11. As described in detail below, the disclosed turbine system 10 employs one or more combustors 16 with an improved design to reduce air flow disturbances within an air supply passage of the combustor 16. The turbine system 10 may use liquid or gas fuel, such as natural gas and/or a synthetic gas, to drive the turbine system 10. As depicted, one or more fuel nozzles 12 intake a fuel supply 14, partially mix the fuel with air, and distribute the fuel and air mixture into the combustor 16 where further mixing occurs between the fuel and air. The air-fuel mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10.

Figure 2:
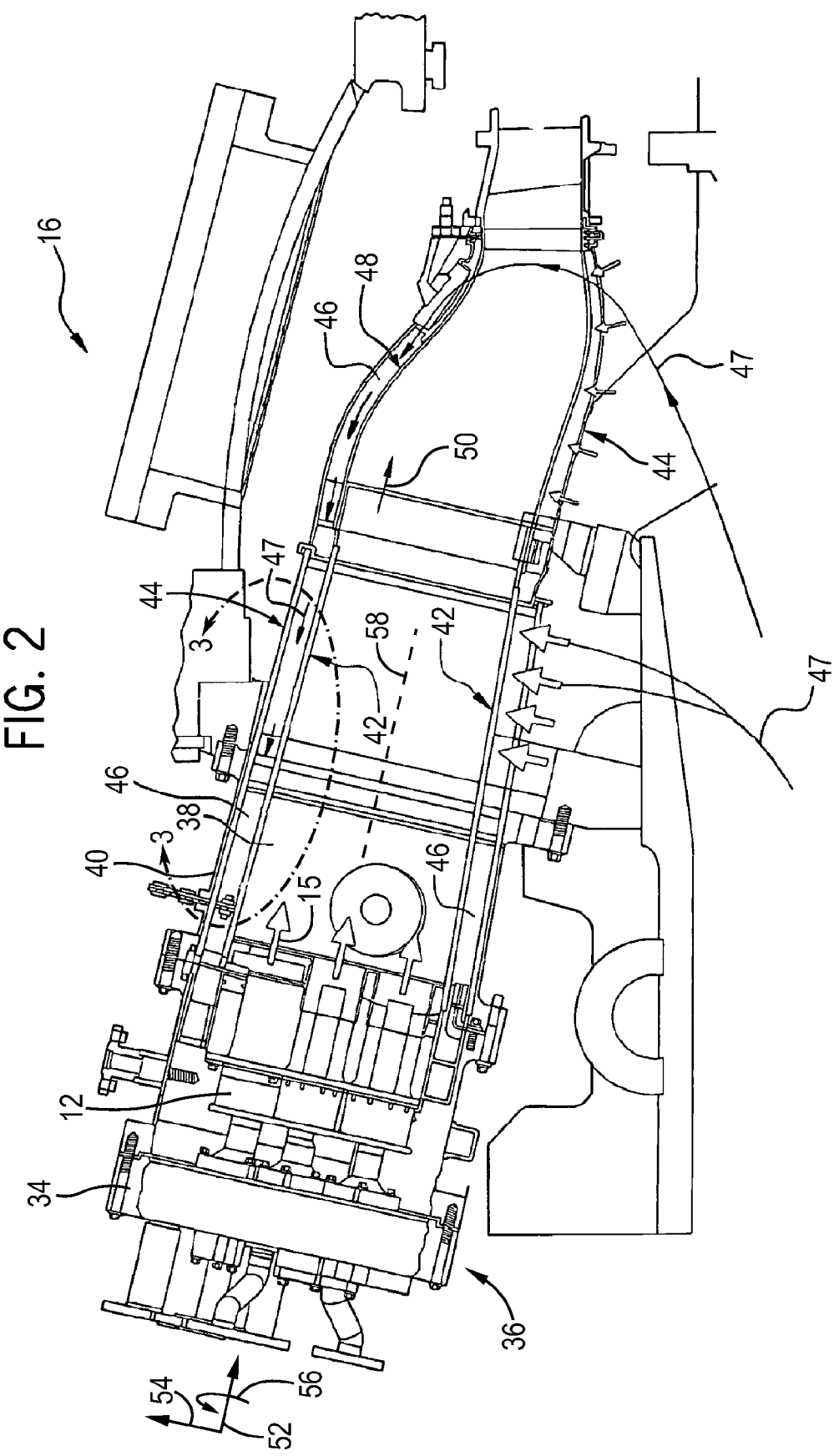
FIG. 2 is a cutaway side view of an embodiment of the turbine system as illustrated in FIG. 1, further illustrating details of the combustor.

FIG. 2 is a cutaway side view of an embodiment of the combustor 16 of the gas turbine engine 11, as illustrated in FIG. 1. In the following discussion, reference may be made to an axial direction or axis 52, a radial direction or axis 54, and a circumferential direction or axis 56, relative to a longitudinal axis 58 of the combustor 16. As illustrated, one or more fuel nozzles 12 are located inside the combustor 16, wherein each fuel nozzle 12 is configured to partially premix air and fuel within intermediate or interior walls of the fuel nozzles 12 upstream of the injection of air, fuel, or an air-fuel mixture into the combustor 16. For example, each fuel nozzle 12 may divert fuel into air passages, thereby partially premixing a portion of the fuel with air to reduce high temperature zones and nitrogen oxide ($NO_x$) emissions. Further, the fuel nozzles 12 may inject a fuel-air mixture 15 into the combustor 16 in a suitable ratio for optimal combustion, emissions, fuel consumption, and power output.

As illustrated in FIG. 2, the plurality of fuel nozzles 12 is attached to an end cover 34, near a head end 36 of the combustor 16. Compressed air and fuel are directed through the end cover 34 and the head end 36 to each of the fuel nozzles 12, which distribute the fuel-air mixture 15 into a combustion chamber 38 of the combustor 16. The combustion chamber 38, or combustion region, is generally defined by a combustion casing 40, a combustion liner 42, and a flow sleeve 44. As shown in FIG. 2, the flow sleeve 44 is disposed about the combustion liner 42. In certain embodiments, the flow sleeve 44 and the combustion liner 42 are coaxial with one another along the axis 58 to define a hollow annular space 46, or annular air passage, which may enable passage of air 47 for cooling and for entry into the head end 36 and the combustion chamber 38. As discussed below, one or more flow enhancing arrangements may be disposed in the hollow annular space 46 to reduce the air flow disturbance associated with structures in the hollow annular space 46. For example, the flow enhancing arrangements may align the structures with one another along a common axis in the axial direction 52 relative to the axis 58 of the combustor 16 to reduce the air flow disturbance caused by the structures. In this manner, the flow enhancing arrangement helps improve the flow, air-fuel mixing, and combustion downstream of the flow enhancing arrangement. For example, downstream of the flow enhancing arrangements, the fuel nozzles 12 inject fuel and air into the combustion chamber 38 to generate hot combustion gases, which then flow through the transition piece 48 to the turbine 18, as illustrated by arrow 50. The combustion gases then drive rotation of the turbine 18 as discussed above.

Figure 3:
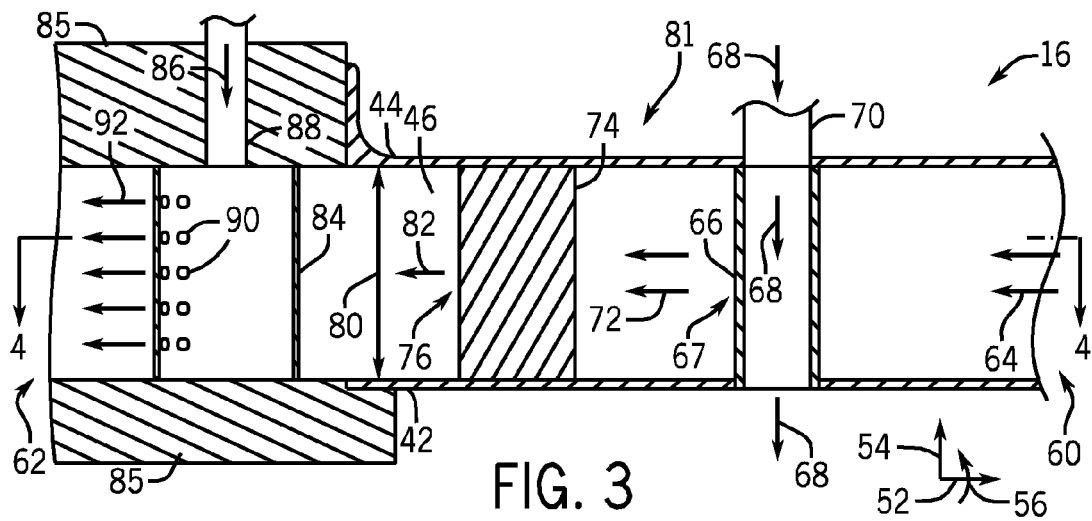
FIG. 3 is a partial cross-sectional side view of an embodiment of the combustor as illustrated in FIG. 2, taken within line 3-3, illustrating a flow enhancing arrangement.

FIG. 3 is a partial cross-sectional side view of an embodiment of the combustor 16 of FIG. 2 taken within line 3-3. As illustrated, the combustor 16 includes an upstream side 60 that receives a compressed airflow 64, and a downstream side 62 that outputs the compressed airflow 64 to the head end 36. Specifically, an airflow 64 enters the upstream side 60 of the annular space 46. Moving downstream from the upstream side 60, a crossfire tube 66 extends radially 54 between the combustion liner 42 and the flow sleeve 44. The crossfire tube 66 obstructs the airflow 64 flowing through the annular space 46, creating a wake in a first wake region 67 located downstream from the crossfire tube 66. The wake region 67 is a region of recirculating flow immediately behind the crossfire tube 66, caused by the flow of surrounding fluid around the crossfire tube 66. In other embodiments, other structures that may be found in the annular space 46 of the combustor 16 and are capable of obstructing the airflow 64, such as, but not limited to, a flame detector, a spark plug, a boss, a spacer, a pressure probe, an axially staged air injector, a sensor, an instrumentation port, and so forth, may be located where the crossfire tube 66 is shown in FIG. 3. In certain embodiments, the structure 66 may be approximately the same height as a radial distance 80 between the combustion liner 42 and the flow sleeve 44. In other embodiments, the height of the structure 66 may be less than the radial distance 80 to accommodate thermal expansion and/or movement of the various components of the combustor 16 during operation. In the illustrated embodiment, the crossfire tube 66 extends between the combustor 16 and another combustor of the gas turbine engine 11. A flame 68 from the other combustor is directed through an external portion 70 of the cross-fire tube 66 to the combustor 16 to ignite the air-fuel mixture in the combustion chamber 38.

As the flow 64 passes the crossfire tube 66 and moves downstream 62, the flow 72 meets a liner mount 74 extending radially 54 between the combustion liner 42 and the flow sleeve 44. The liner mount 74 helps to prevent the combustion liner 42 from moving axially and/or rotating during operation of the combustor 16. In certain embodiments, the liner mount 74 may include first and second mounting portions coupled to one another. The first mounting portion may be coupled to the combustion liner 42 and the second mounting portion may be coupled to the flow sleeve 44. The liner mount 74 obstructs the downstream airflow 72 flowing from the cross-fire tube 66, creating a wake in a second wake region 76 located downstream from the liner mount 74. The wake region 76 is a region of recirculating flow immediately behind the liner mount 74, caused by the flow of surrounding fluid around the liner mount 74. In other embodiments, other structures, such as, but not limited to, a flame detector, a spark plug, a boss, a spacer, a pressure probe, an axially staged air injector, a sensor, an instrumentation port, and so forth, may be located where the liner mount 74 is shown in FIG. 3. In certain embodiments, the liner mount 74 may be approximately the same height as the radial distance 80 between the combustion liner 42 and the flow sleeve 44. In other embodiments, the height of the liner mount 74 or other structure may be less than the radial distance 80 to accommodate thermal expansion and/or movement of the various components of the combustor 16 during operation or for other reasons. In other embodiments, the positions of the crossfire tube 66 and the liner mount 74 may be swapped. In other words, the liner mount 74 may be upstream of the crossfire tube 66.

When the crossfire tube 66 and the liner mount 70 are aligned with one another in a flow enhancing arrangement 81 along a common axis in the axial direction 52 relative to the axis 58 of the combustor 16, the amount of air flow disturbance in the airflow 82 downstream of the liner mount 70 is reduced. In certain embodiments, the downstream airflow 82 may encounter one or more fuel injectors 84 disposed downstream of the crossfire tube 66, the liner mount 70, the combustion liner 42, and the flow sleeve 44. Specifically, the fuel injectors 84 may be located in an annulus formed by a cap 85. In certain embodiments, the fuel injector 84 may be a quaternary injector that injects a portion of a fuel 86 into the downstream airflow 82 upstream from the fuel nozzles 12. The fuel 86 may be carried to the fuel injector 84 through a fuel manifold 88. In certain embodiments, one or more fuel openings 90 may be disposed in the fuel injector 84 facing toward the downstream side 62 of the combustor 16. The fuel 86 may mix with the downstream airflow 82 to form an air-fuel mixture 92 that then flows to the fuel nozzles 12. When the crossfire tube 66, the liner mount 70, and the fuel injector 84 are aligned with one another in the flow enhancing arrangement 81 along a common axis in the axial direction 52 relative to the axis 58 of the combustor 16, the amount of air flow disturbance in the air-fuel mixture 92 downstream of the fuel injector 84 is reduced.

Figure 4:
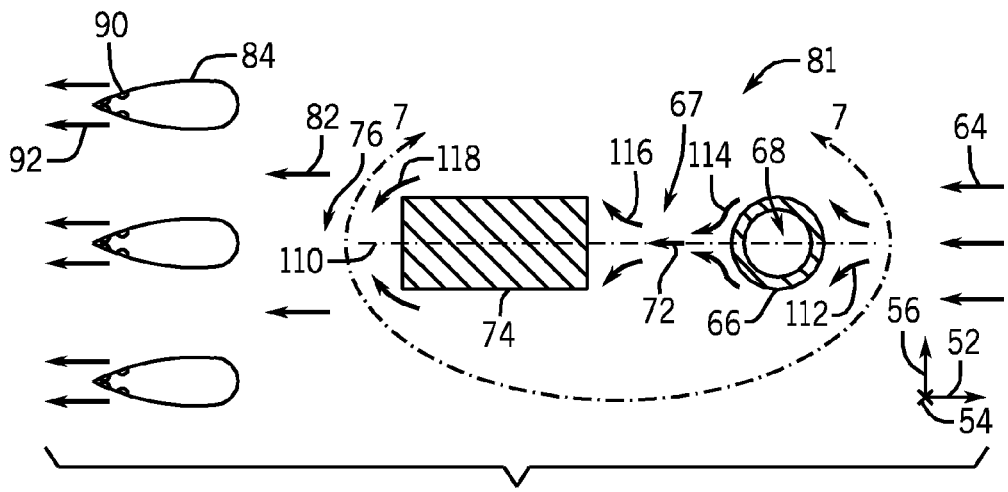
FIG. 4 is a cross-sectional top view of an embodiment of a flow enhancing arrangement and a plurality of fuel injectors taken along line 4-4 of FIG. 3.

FIG. 4 is a top cross-sectional view of an embodiment of the flow enhancing arrangement 81 taken along the line labeled 4-4 in FIG. 3. As shown in FIG. 4, the crossfire tube 66, the liner mount 74, and the fuel injector 84 are aligned along an axis 110 in the axial direction 52 relative to the axis 58 of the combustor 16. In addition, the crossfire tube 66 is located upstream from the liner mount 74. In the illustrated embodiment, the crossfire tube 66 has a circular cross-sectional shape. In other embodiments, as discussed in detail below, the crossfire tube 66 may have other cross-sectional shapes, such as oval, tapered, aerodynamic, or airfoil shapes. The illustrated liner mount 74 has a rectangular cross-sectional shape. In other embodiments, as discussed in detail below, the liner mount 74 may have other cross-sectional shapes, such as circular, oval, tapered, aerodynamic, or airfoil shapes. In various embodiments, the shape and other characteristics (e.g., width, length, height, surface texture, spacing between the crossfire tube 66 and the liner mount 74, and so forth) of the crossfire tube 66 and the liner mount 74 may be adjusted to reduce the wakes in the first and second wake regions 67 and 76, respectively.

As shown in FIG. 4, upon reaching the crossfire tube 66, the airflow 64 divides into upstream flows 112 around the crossfire tube 66. The upstream flows 112 flow along opposite curved surfaces of the crossfire tube 66 and downstream flows 114 combine to form the downstream airflow 72 in the first wake region 67. Similarly, the downstream airflow 72 divides into upstream flows 116 around the liner mount 74. The upstream flows 116 flow along opposite surfaces of the liner mount 74 and downstream flows 118 combine to form the downstream airflow 82 in the second wake region 76. As discussed in detail below, one or both of the crossfire tube 66 and the liner mount 74 may have aerodynamic cross-sectional shapes, which may improve the flows 112, 114, 116, and/or 118.

As further illustrated in FIG. 4, the annular space 46 may include more than one fuel injector 84. Each of the fuel injectors 84 may have an aerodynamic, or airfoil, cross-sectional shape. Thus, at least one of the fuel injector 84, the liner mount 74, or the crossfire tube 66 includes an airfoil shaped cross-section. Such a configuration of the fuel injectors 84 may reduce a wake in the air-fuel mixture 92 downstream of the fuel injectors 84. In addition, alignment of the crossfire tube 66, the liner mount 74, and the fuel injector 84 in the flow enhancing arrangement 81 may offer several benefits. For example, less of the fuel 86 may be pulled into the wake region 76 behind the liner mount 74. This may reduce the possibility of flame holding of the gas turbine engine 11 and/or enable greater fuel injection efficiency for increased performance of the gas turbine engine 11. In addition, the overall pressure drop through the annular space 46 may be reduced through use of the flow enhancing arrangement 81. Thus, use of the flow enhancing arrangement 81 may improve uniformity of airflow and air-fuel mixing upstream of the head end 36, thereby improving airflow and air-fuel mixing in the fuel nozzles 12.

Figure 5:
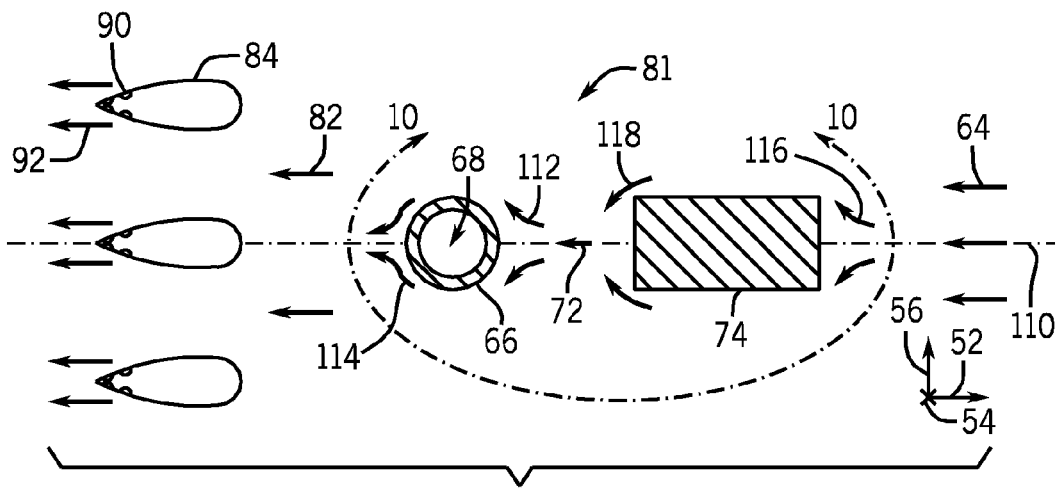
FIG. 5 is a cross-sectional top view of an embodiment of a flow enhancing arrangement and a plurality of fuel injectors taken along line 4-4 of FIG. 3.

FIG. 5 is a top cross-sectional view of another embodiment of the flow enhancing arrangement 81 taken along the line labeled 4-4 in FIG. 3. As shown in FIG. 5, the liner mount 74 is located upstream from the crossfire tube 66. In other respects, the illustrated embodiment is similar to that shown in FIG. 4. For example, in the illustrated embodiment, the crossfire tube 66 has a circular cross-sectional shape and the liner mount 74 has a rectangular cross-sectional shape. In addition, upstream and downstream flows 116 and 118 flow around the liner mount 74 and upstream and downstream flows 112 and 114 flow around the crossfire tube 66. Further, the alignment of the liner mount 74, the crossfire tube 66, and the fuel injector 84 along the axis 110 shown in FIG. 5 is another example of the flow enhancing arrangement 81. Thus, the flow enhancing arrangement 81 may include various structures in different orders or sequences. For example, in certain embodiments, the fuel injector 84 may be upstream of the crossfire tube 66 and/or the liner mount 74.

Figure 6:
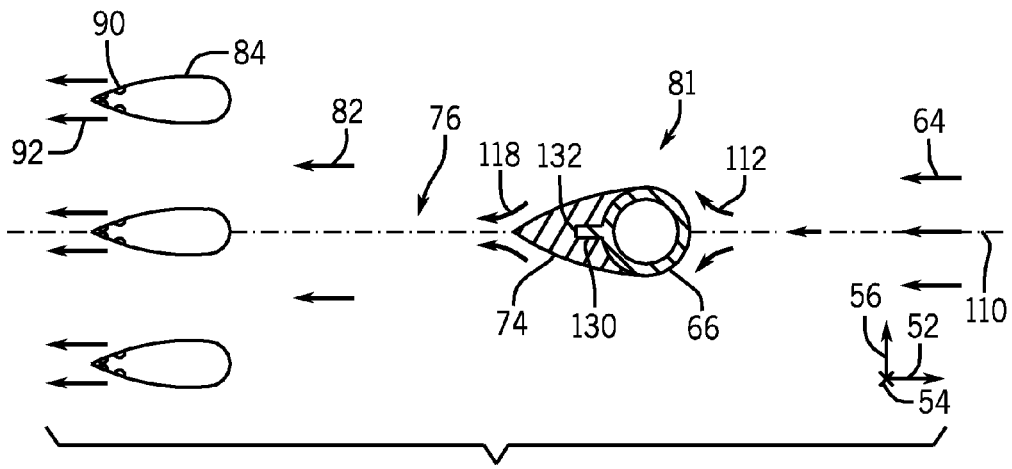
FIG. 6 is a cross-sectional top view of an embodiment of a flow enhancing arrangement and a plurality of fuel injectors taken along line 4-4 of FIG. 3.

FIG. 6 is a top cross-sectional view of an embodiment of the flow enhancing arrangement 81 taken along the line labeled 4-4 in FIG. 3. As shown in FIG. 6, the crossfire tube 66 is located upstream from the liner mount 74. In other embodiments, the liner mount 74 may be located upstream from the crossfire tube 66. In the illustrated embodiment, the crossfire tube 66 and the liner mount 74 are coupled together. Such a configuration of the flow enhancing arrangement 81 effectively eliminates the first wake region 67 downstream of the crossfire tube 66. In the illustrated embodiment, the one-piece structure of the crossfire tube 66 and the liner mount 74 has an aerodynamic cross-sectional shape, such as an airfoil shape, which may reduce the wake in the second wake region 76. In other words, the crossfire tube 66 constitutes a first portion of the aerodynamic cross-sectional shape and the liner mount 74 constitutes a second portion. As shown in FIG. 6, the upstream flows 112 flow along the aerodynamic surfaces of the crossfire tube 66 and the downstream flows 118 flow along the aerodynamic surfaces of the liner mount 74 and aerodynamically recombine to form the downstream airflow 82 in the wake region 76 extending from the liner mount 74. Thus, the one-piece structure of the crossfire tube 66 and the liner mount 74 may reduce a wake in the downstream airflow 82. In other words, the aerodynamic cross-sectional shape of the crossfire tube 66 and the liner mount 74 substantially reduces or eliminates a low velocity recirculation zone downstream of the liner mount 74. Without the aerodynamic cross-sectional shape of the crossfire tube 66 and the liner mount 74, the wake region 76 may include a low velocity region due to a significant gap between the downstream flows 118. In the illustrated embodiment, the downstream flows 118 gradually converge with one another to eliminate such a gap, thereby reducing the possibility of any low velocity region downstream of the liner stop 74. In other words, the upstream and downstream flows 112 and 118 are guided toward one another by the aerodynamic cross-sectional shape of the one-piece structure of the crossfire tube 66 and the liner mount 74 to combine directly downstream of the liner stop 74 to fill the wake region 76. In other embodiments, the one-piece structure of the crossfire tube 66 and the liner mount 74 may not have an aerodynamic cross-sectional shape.

Further, the crossfire tube 66 of the illustrated embodiment includes a first alignment feature 130 and the liner mount 74 includes a second alignment feature 132. The first and second alignment features 130 and 132 mate with one another to maintain the alignment of the crossfire tube 66, the liner mount 74, and the fuel injector 84 in the axial direction 52 along the axis 110. As shown in FIG. 6, the first alignment feature 130 may be a male alignment portion (e.g., a tab) and the second alignment feature 132 may be a female alignment portion (e.g., a notch). In other embodiments, the first alignment feature 130 may be the female alignment portion and the second alignment feature 132 may be the male alignment portion. In the absence of the first and second alignment features 130 and 132, the liner mount 74 may rotate about the crossfire tube 66, because of the circular cross-sectional shape of the crossfire tube 66. In other embodiments in which the crossfire tube 66 does not have a circular cross-sectional shape, the first and second alignment features 130 and 132 may be omitted. In certain embodiments, the crossfire tube 66 and the liner mount 74 may be coupled together via adhesives, welds, brazes, bolts, screws, mechanical joints, or other suitable fasteners. In addition, one or both of the crossfire tube 66 and the liner mount 74 may be coupled to one or both of the combustion liner 42 and the flow sleeve 44.

Figure 7:
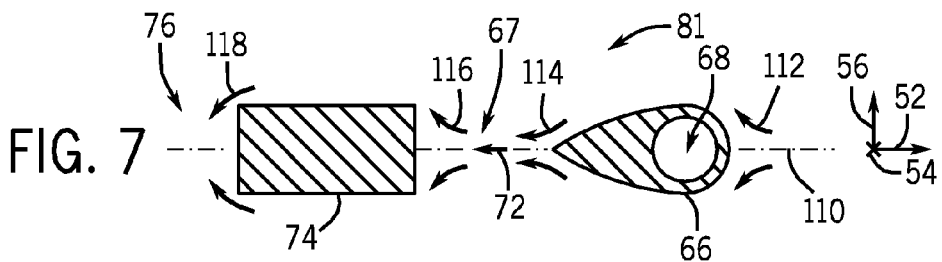
FIG. 7 is a cross-sectional top view of an embodiment of a flow enhancing arrangement taken within line 7-7 of FIG. 4.

FIG. 7 is a top cross-sectional view of an embodiment of the flow enhancing arrangement 81 taken within the line labeled 7-7 in FIG. 4. As shown in FIG. 7, the crossfire tube 66 and the liner mount 74 are aligned along the axis 110 in the axial direction 52 relative to the axis 58 of the combustor 16. In addition, the crossfire tube 66 is located upstream from the liner mount 74. In addition, the crossfire tube 66 has an aerodynamic, or airfoil, cross-sectional shape, which may reduce the wake in the first wake region 67. In other embodiments, the crossfire tube 66 may have other aerodynamic cross-sectional shapes, such as oval, tapered, or generally diverging-converging surfaces. Thus, the fuel injector 84 may be a first airfoil shaped cross-section and the crossfire tube 66 may be a second airfoil shaped cross-section of the flow enhancing arrangement 81. In other respects, the illustrated embodiment is similar to previously discussed embodiments.

Figure 8:
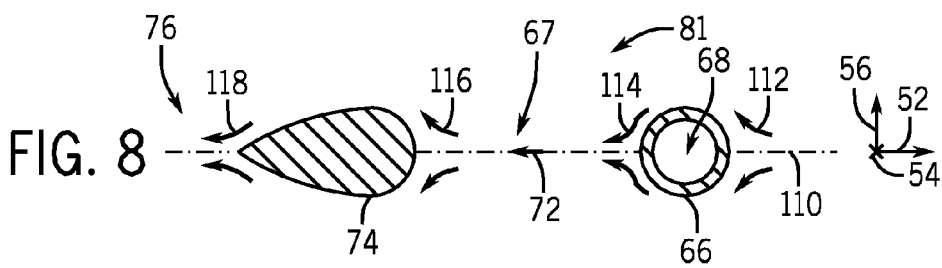
FIG. 8 is a cross-sectional top view of an embodiment of a flow enhancing arrangement taken within line 7-7 of FIG. 4.

FIG. 8 is a top cross-sectional view of another embodiment of the flow enhancing arrangement 81 taken within the line labeled 7-7 in FIG. 4. As shown in FIG. 8, the crossfire tube 66 and the liner mount 74 are aligned along the axis 110 in the axial direction 52 relative to the axis 58 of the combustor 16. In addition, the crossfire tube 66 is located upstream from the liner mount 74. In addition, the liner mount 74 has an aerodynamic, or airfoil, cross-sectional shape, which may reduce the wake in the second wake region 76. In other embodiments, the liner mount 74 may have other aerodynamic cross-sectional shapes, such as oval, tapered, or generally diverging-converging surfaces. In other respects, the illustrated embodiment is similar to previously discussed embodiments.

Figure 9:
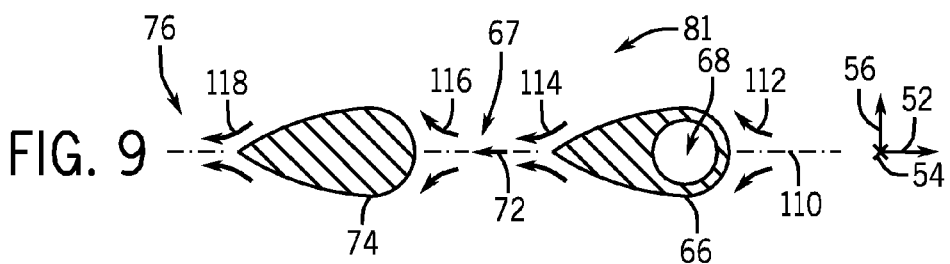
FIG. 9 is a cross-sectional top view of an embodiment of a flow enhancing arrangement taken within line 7-7 of FIG. 4.

FIG. 9 is a top cross-sectional view of a further embodiment of the flow enhancing arrangement 81 taken within the line labeled 7-7 in FIG. 4. As shown in FIG. 9, the crossfire tube 66 and the liner mount 74 are aligned along the axis 110 in the axial direction 52 relative to the axis 58 of the combustor 16. In addition, the crossfire tube 66 is located upstream from the liner mount 74. In addition, both the crossfire tube 66 and the liner mount 74 have aerodynamic, or airfoil, cross-sectional shapes, which may reduce the wakes in the first and second wake regions 67 and 76, respectively. In other embodiments, the crossfire tube 66 and the liner mount 74 may have other aerodynamic cross-sectional shapes, such as oval, tapered, or generally diverging-converging surfaces. In certain embodiments, the fuel injector 84 may include an airfoil shaped cross-section and be disposed either upstream or downstream of the crossfire tube 66 and/or the liner mount 74. For example, the fuel injector 84 may be a first airfoil shaped cross-section, the liner mount 74 may be a second airfoil shaped cross-section, and the crossfire tube 66 may be a third airfoil shaped cross-section of the flow enhancing arrangement 81. In other respects, the illustrated embodiment is similar to previously discussed embodiments.

Figure 10:
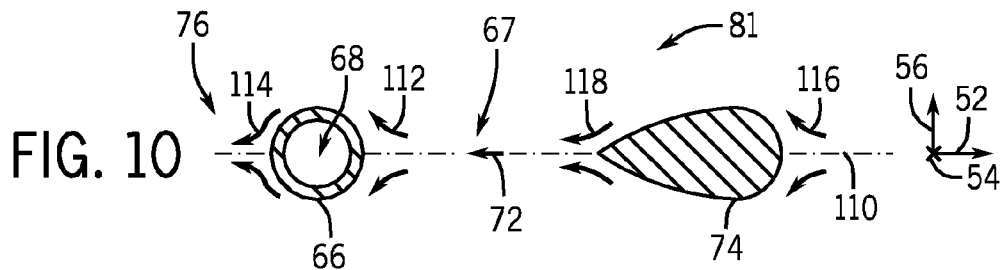
FIG. 10 is a cross-sectional top view of an embodiment of a flow enhancing arrangement taken within line 10-10 of FIG. 5.

FIG. 10 is a top cross-sectional view of an embodiment of the flow enhancing arrangement 81 taken within the line labeled 10-10 in FIG. 5. As shown in FIG. 10, the crossfire tube 66 and the liner mount 74 are aligned along the axis 110 in the axial direction 52 relative to the axis 58 of the combustor 16. In addition, the liner mount 74 is located upstream from the crossfire tube 66. In addition, the liner mount 74 has an aerodynamic, or airfoil, cross-sectional shape, which may reduce the wake in the first wake region 67. Thus, the fuel injector 84 may be a first airfoil shaped cross-section and the liner mount 74 may be a second airfoil shaped cross-section of the flow enhancing arrangement 81. In other respects, the illustrated embodiment is similar to previously discussed embodiments.

Figure 11:
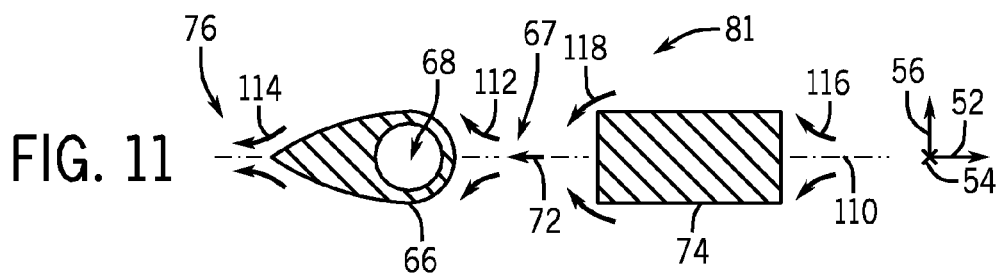
FIG. 11 is a cross-sectional top view of an embodiment of a flow enhancing arrangement taken within line 10-10 of FIG. 5.

FIG. 11 is a top cross-sectional view of another embodiment of the flow enhancing arrangement 81 taken within the line labeled 10-10 in FIG. 5. As shown in FIG. 11, the crossfire tube 66 and the liner mount 74 are aligned along the axis 110 in the axial direction 52 relative to the axis 58 of the combustor 16. In addition, the liner mount 74 is located upstream from the crossfire tube 66. In addition, the crossfire tube 66 has an aerodynamic, or airfoil, cross-sectional shape, which may reduce the wake in the second wake region 76. In other respects, the illustrated embodiment is similar to previously discussed embodiments.

Figure 12:
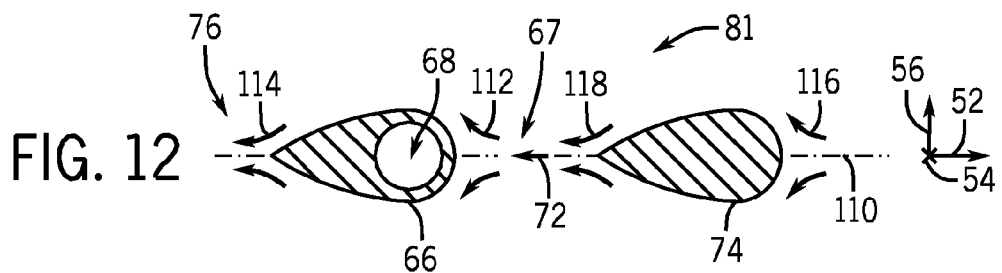
FIG. 12 is a cross-sectional top view of an embodiment of a flow enhancing arrangement taken within line 10-10 of FIG. 5.

FIG. 12 is a top cross-sectional view of another embodiment of the flow enhancing arrangement 81 taken within the line labeled 10-10 in FIG. 5. As shown in FIG. 12, the crossfire tube 66 and the liner mount 74 are aligned along the axis 110 in the axial direction 52 relative to the axis 58 of the combustor 16. In addition, the liner mount 74 is located upstream from the crossfire tube 66. In addition, both the liner mount 74 and the crossfire tube 66 have aerodynamic, or airfoil, cross-sectional shapes, which may reduce the wakes in the first and second wake regions 67 and 76, respectively. In other words, the liner mount 74 may be a first airfoil shaped cross-section and the crossfire tube 66 may be a second airfoil shaped cross-section of the flow enhancing arrangement 81. As with previous embodiments, the fuel injector 84 may include an airfoil shaped cross-section and be disposed either upstream or downstream of the crossfire tube 66 and/or the liner mount 74. In other respects, the illustrated embodiment is similar to previously discussed embodiments.

Figure 13:
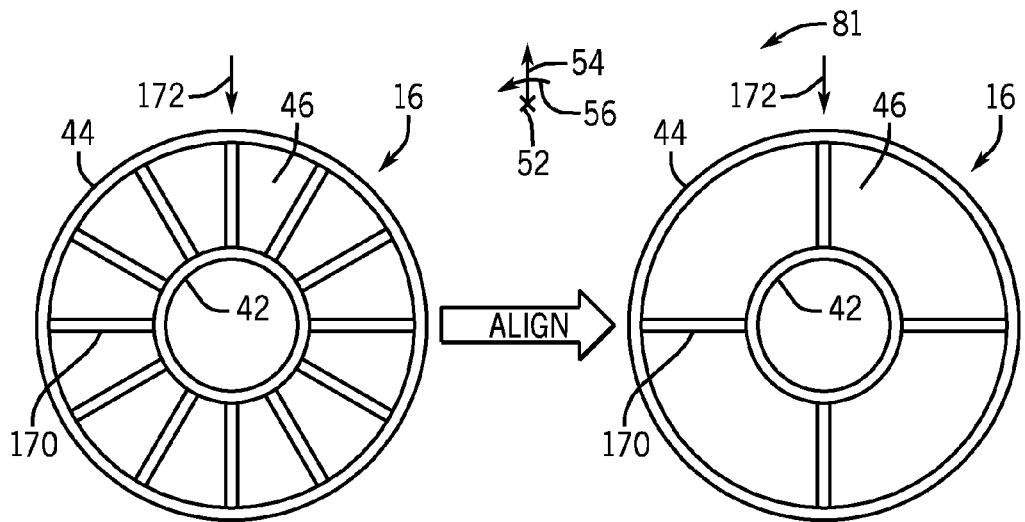
FIG. 13 is a front elevational view of a combustor before and after implementing an embodiment of a flow enhancing arrangement.

FIG. 13 is a front elevational view of a combustor 16 before and after implementing an embodiment of the flow enhancing arrangement 81. On the left side of FIG. 13, the combustor 16 is shown prior to implementing the flow enhancing arrangement 81. Specifically, the flow sleeve 44 is shown surrounding the combustion liner 42 and several structures 170 are shown extending between the flow sleeve 44 and the combustion liner 42. Examples of structures 170 include, but are not limited to, the crossfire tube 66, the liner mount 74, the fuel injector 84, a flame detector, a spark plug, a boss, a spacer, a pressure probe, an axially staged air injector, a sensor, an instrumentation port, or any similar object that may be found in the annular space 46 of the combustor 16. For example, three liner mounts 74 may be installed at approximately 60 degrees, 180 degrees, and 300 degrees relative to top dead center (TDC) 172 of the combustion liner 42. In other embodiments, the liner mounts 74 may be installed at different locations and the number of liner mounts 74 may be greater or fewer than three. Further, in certain embodiments, two crossfire tubes 66 may be installed per combustor 16. As shown on the left side of FIG. 13, the various structures 170 are not aligned with one another. Thus, each of the structures creates an air flow disturbance downstream of the structure 170. On the right side of FIG. 13, the combustor 16 is shown after implementing the flow enhancing arrangement 81. Specifically, several of the structures 170 have been aligned with one another in the axial direction 52. Thus, the number of air flow disturbances has decreased compared to the left side of FIG. 13. In addition, one or more of the structures 170 may also include an aerodynamic cross-sectional shape to reduce the wakes downstream of the structures 170.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine combustor, comprising:
   a combustion liner disposed about a combustion region;
   a flow sleeve disposed about the combustion liner;
   an air passage extending between the combustion liner and the flow sleeve into a head end region;
   a fuel injector disposed along the air passage to inject fuel into the air passage;
   a liner mount disposed along the air passage, wherein the liner mount extends between the combustion liner and the flow sleeve; and
   a crossfire tube disposed along the air passage, wherein the crossfire tube extends between the combustion liner and the flow sleeve, wherein the fuel injector, the liner mount, and the crossfire tube are in line with one another in a flow enhancing arrangement along a common axis in an axial direction relative to an axis of the gas turbine combustor, wherein the flow enhancing arrangement reduces an air flow disturbance caused by the fuel injector, the liner mount, and the crossfire tube.

2. The system of claim 1, wherein the fuel injector comprises a first airfoil shaped cross-section, the liner mount comprises a second airfoil shaped cross-section, and the crossfire tube comprises a third airfoil shaped cross-section.

3. The system of claim 1, wherein at least one of the fuel injector, the liner mount, or the crossfire tube comprises an airfoil shaped cross-section.

4. The system of claim 3, wherein the fuel injector comprises a first airfoil shaped cross-section, and the liner mount or the crossfire tube comprises a second airfoil shaped cross-section.

5. The system of claim 3, wherein the liner mount comprises a first airfoil shaped cross-section, and the crossfire tube comprises a second airfoil shaped cross-section.

6. The system of claim 1, wherein the liner mount and the crossfire tube are disposed upstream of the fuel injector along an airflow path through the air passage.

7. The system of claim 1, wherein the liner mount is disposed upstream of the crossfire tube along an airflow path through the air passage.

8. The system of claim 1, wherein the crossfire tube is disposed upstream of the liner mount along an airflow path through the air passage.

9. The system of claim 1, wherein the liner mount and the crossfire tube are coupled together.

10. The system of claim 9, comprising a one-piece aerodynamic structure having both the liner mount and the crossfire tube.

11. The system of claim 9, wherein the liner mount comprises a first portion of an aerodynamic shape, the crossfire tube comprises a second portion of an aerodynamic shape, and the liner mount couples to the crossfire tube to define the aerodynamic shape.

12. The system of claim 1, wherein the liner mount comprises a first mounting portion coupled to a second mounting portion, the first mounting portion is coupled to the combustion liner, and the second mounting portion is coupled to the flow sleeve.

13. A system, comprising:
a turbine combustor alignment feature, comprising:
a turbine combustor liner mount configured to extend between a combustion liner and a flow sleeve of a gas turbine combustor;
a fuel injector disposed along an air passage extending between the combustion liner and the flow sleeve, wherein the fuel injector is configured to inject fuel into the air passage; and
a turbine combustor structure configured to extend between the combustion liner and the flow sleeve, wherein the turbine combustor liner mount, the fuel injector, and the turbine combustor structure are configured to align with one another in a flow enhancing arrangement along a common axis in an axial direction relative to an axis of the gas turbine combustor, wherein the flow enhancing arrangement reduces an air flow disturbance caused by the turbine combustor liner mount, the fuel injector, and the turbine combustor structure.

14. The system of claim 13, wherein the turbine combustor structure comprises a crossfire tube, flame detector, a spark plug, a boss, a spacer, a pressure probe, an axially staged air injector, a sensor, an instrumentation port, or a combination thereof.

15. The system of claim 13, comprising the gas turbine combustor or a gas turbine engine having the turbine combustor alignment feature disposed in the air passage between the combustion liner and the flow sleeve.

16. The system of claim 13, wherein at least one of the turbine combustor liner mount or the turbine combustor structure comprises an airfoil shaped cross-section.

17. A method, comprising:
directing an airflow about a crossfire tube extending between a combustion liner and a flow sleeve of a gas turbine combustor;
directing the airflow about a liner mount extending between the combustion liner and the flow sleeve;
directing the airflow about a fuel injector disposed along an air passage extending between the combustion liner and the flow sleeve, wherein the fuel injector is configured to inject fuel into the air passage; and
reducing an airflow disturbance by axially aligning the airflow about the crossfire tube, the liner mount, and the fuel injector in a flow enhancing arrangement along a common axis in an axial direction relative to an axis of the gas turbine combustor.

18. The method of claim 17, wherein reducing the airflow disturbance comprises axially aligning a crossfire tube wake of the crossfire tube with a liner mount wake of the liner mount.

19. The method of claim 17, wherein reducing the airflow disturbance comprises aerodynamically flowing the airflow about a first airfoil shape of the crossfire tube and a second airfoil shape of the liner mount.

* * * * *